US012276316B2

(12) United States Patent
Verrelst et al.

(10) Patent No.: US 12,276,316 B2
(45) Date of Patent: Apr. 15, 2025

(54) GEAR WHEEL AND COMPRESSOR DEVICE EQUIPPED WITH SUCH GEAR WHEEL

(71) Applicant: ATLAS COPCO AIRPOWER, NAAMLOZE VENNOOTSCHAP, Wilrijk (BE)

(72) Inventors: Björn Verrelst, Wilrijk (BE); Stijn Pittois, Wilrijk (BE); Nils Vercauteren, Wilrijk (BE); Hans Meeus, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 27 days.

(21) Appl. No.: 17/797,271

(22) PCT Filed: Feb. 4, 2021

(86) PCT No.: PCT/IB2021/050894
§ 371 (c)(1),
(2) Date: Aug. 3, 2022

(87) PCT Pub. No.: WO2021/156778
PCT Pub. Date: Aug. 12, 2021

(65) Prior Publication Data
US 2023/0052482 A1 Feb. 16, 2023

(30) Foreign Application Priority Data
Feb. 6, 2020 (BE) .................................. 2020/5069

(51) Int. Cl.
*F16F 15/14* (2006.01)
*F16H 55/14* (2006.01)

(52) U.S. Cl.
CPC .......... *F16F 15/1435* (2013.01); *F16H 55/14* (2013.01); *F16F 2236/045* (2013.01)

(58) Field of Classification Search
CPC .. F16F 15/1435; F16F 2236/045; F16H 55/14
See application file for complete search history.

(56) References Cited

U.S. PATENT DOCUMENTS 2,159,235 A * 5/1939 Tyler ..................... F16F 15/124
74/574.4
2,446,942 A * 8/1948 McFarland ........... F16F 15/124
464/83

(Continued)

FOREIGN PATENT DOCUMENTS

BE 1026106 A1 10/2019
CN 108688403 A 10/2018

(Continued)

OTHER PUBLICATIONS

Chinese Patent Publication and Machine Translation for CN 202812067 U; Inventors: Jiang and Ma; Title: An Air Compressor Gear With Filling Rubber; Published Jul. 20, 2012. (Year: 2012).*

(Continued)

*Primary Examiner* — Mary A Davis
(74) *Attorney, Agent, or Firm* — Sughrue Mion, PLLC (57) ABSTRACT

Gear wheel that is provided with spokes (17) which extend between a rim (16) supporting a gear mesh (15) and a corresponding gear hub (18), whereby free spaces (19) are located between the spokes (17) which extend between the rim (16) and the gear hub (18), characterised in that at least one of said free spaces (19) is filled with a block (20) made of a rigid, incompressible material, whereby between the gear wheel (10) on the one hand and the block (20) on the other hand a viscoelastic material (21) is located.

28 Claims, 7 Drawing Sheets

(56) References Cited

U.S. PATENT DOCUMENTS

| | | | | |
|---|---|---|---|---|
| 3,195,324 | A | * | 7/1965 | Sellwood .................. F16D 3/68 74/411 |
| 3,385,127 | A | * | 5/1968 | Naruse .................... F16H 55/06 74/449 |
| 3,857,296 | A | * | 12/1974 | Tsunoda .................. F16H 55/14 74/443 |
| 3,940,947 | A | * | 3/1976 | Ahlen ....................... F16D 3/70 464/85 |
| 4,174,643 | A | * | 11/1979 | Tsukamoto ............. F16H 55/14 74/433.5 |
| 8,117,943 | B2 | | 2/2012 | Manzoor |
| 2012/0257997 | A1 | * | 10/2012 | Morita .................. F04C 29/005 417/415 |
| 2019/0219130 | A1 | | 7/2019 | Jia |

FOREIGN PATENT DOCUMENTS

| | | |
|---|---|---|
| DE | 24 55 385 A1 | 5/1976 |
| DE | 35 35 859 A1 | 4/1987 |
| DE | 1 233 215 B | 1/1996 |
| DE | 199 58 036 A1 | 6/2001 |
| DE | 10 2008 059 042 A | 5/2010 |
| DE | 10 2017 116 542 A1 | 1/2018 |
| DE | 10 2017 204 146 A1 | 9/2018 |
| WO | 92/18754 A1 | 10/1992 |
| WO | 2015/020303 A1 | 2/2015 |

OTHER PUBLICATIONS

International Search Report for PCT/IB2021/050894, dated May 28, 2021.
Written Opinion for PCT/IB2021/050894, dated May 28, 2021.

* cited by examiner

GEAR WHEEL AND COMPRESSOR DEVICE EQUIPPED WITH SUCH GEAR WHEEL

CROSS REFERENCE TO RELATED APPLICATIONS

This application is a National Stage of International Application No. PCT/IB2021/050894 filed Feb. 4, 2021, claiming priority based on Belgium Patent Application No. 2020/5069 filed Feb. 6, 2020.

The present invention relates to a gear wheel.

In particular the invention relates to a gear wheel that can be used for a gearbox or gear transmission between for example a compressor element and a drive.

It is known that compressor elements are driven at great speeds by the drive and are subject to high dynamic process forces.

Consequently, the device is prone to vibration-related problems. Vibrations generated in the compressor element and/or the drive can propagate through the transmission. These vibrations are chiefly caused by an imbalance of the drive and pulsations of the process forces of the compressor element in combination with the occurrence of resonances.

Different dynamic problems occur, both in the drive and in the compressor element.

One of said problems is a combination of torque and the bending of the shaft and compression of the bearings, a combined torque-lateral 'mode-shape' or torque and axial mode-shape or the use of gear wheel pairs with a helix gear mesh.

A solution that uses a flexible coupling between the drive and the compressor element is already known.

The flexible coupling ensures a dynamic uncoupling between torsional dynamics of the drive and the compressor element.

Furthermore, this will also simplify the alignment between the two and result in a damping of the vibrations.

However, such flexible coupling shows a number of disadvantages:
  the flexible coupling represents an extra additional cost;
  the size of the gear transmission is increased;
  extra bearings must be provided because the floating gear wheel requires a separate bearing;
  the flexible coupling must transmit the complete power and is therefore prone to wear and tear because the flexible material degrades over time, such that the flexible transmission needs to be replaced regularly; and
  the maximum permitted speeds are limited, whereas the new motors themselves allow higher speeds.

This is why a so-called direct coupling is preferred in modern machine design; the floating gear wheel is directly on the motor shaft.

Such direct coupling is very rigid, the result being that all mode shapes are coupled.

Moreover, such coupled modes are very undamped because the damping material of the flexible coupling is not present. Consequently, the drive is prone to dynamic excitations such as imbalance and compression pulsations.

Said combined torque-lateral mode shape i.e. a combination of torque and the bending of the shaft results in a so-called rattle in the gear wheels.

This is caused because certain mode shapes are excited or transmitted by the drive and/or the compressor element.

Gear wheels with spokes, which are used in a transmission to uncouple the dynamics between the drive and the compressor element are already known.

By using gear wheels with spokes, the gear wheel becomes more torsionally flexible, efficiently preventing the propagation of vibrations, particularly torsional vibrations.

Such gear wheels have the consequence that the eigenfrequencies of certain mode shapes are shifted such that they are not excited.

For certain mode shapes this is not always possible because the gear wheel with spokes cannot be made too weak. Moreover, during the start-up it is still necessary to go through the lowered mode shapes.

WO 2011/047807 A1 describes a device for torsional vibration damping in rotating components whereby use is made of rubber elements which are mounted between the rotating components and whereby the torque is transmitted via the rubber elements. This has the disadvantage that there is not only a greater risk of failure of the rubber but also that the rubber will have to be regularly replaced due to wear and tear.

The purpose of the present invention is to improve the properties of gear wheels with spokes, such that the damping value of the transmission can be increased, such that excitation of certain mode shapes can be reduced or avoided and to offer a solution to at least one of the aforementioned and other disadvantages.

To this end, the invention relates to a gear wheel that is provided with spokes which extend between a rim supporting a gear mesh and a corresponding gear hub, whereby free spaces are located between the spokes which extend between the rim and the gear hub, characterised in that at least one of said free spaces is filled with a block made of a rigid, incompressible material, whereby between the gear wheel on the one hand and the block on the other hand a viscoelastic material or a viscous fluid is located.

This provides the advantage that by filling the free spaces with a block of incompressible material and a viscoelastic material, the gear wheel will show good damping properties for the torque-lateral mode shapes and any other possibly coupled mode shapes.

Said vibrations and the bending of the shaft, will deform the gear wheel with spokes.

Said deformation will compress the viscoelastic material between the block and the gear wheel which will result in damping, whereas the block will ensure that the deformation of the gear wheel remains limited.

It is important to note that by providing the block, or 'core', from incompressible material, it will be possible to compress the viscoelastic material more efficiently between the block and the gear wheel when the gear wheel deforms due to the occurring vibrations, than when said free spaces are completely filled with a viscoelastic material.

An alternative embodiment relates to a gear wheel that is provided with spokes which extend between a rim supporting a gear mesh and a corresponding gear hub, whereby free spaces are located between the spokes which extend between the rim and the gear hub, characterised in that at least one of said free spaces is completely filled with a block, made of a viscoelastic material.

Note that in said embodiment there is no additional viscoelastic material between the gear wheel on the one hand and the block on the other hand.

Such embodiment will also obtain the damping effect as described above.

As it is exactly the compression of the viscoelastic material that will generate the damping properties, providing the block in the free spaces will improve the damping properties of the gear wheel according to the invention.

In a practical embodiment, the viscoelastic material is mounted between the spokes and the block. This material will be loaded in tension and thus provide the damping.

Additionally or alternatively, the viscoelastic material is mounted between, on the one hand, the block and, on the other hand, the gear hub and the rim. The material is loaded on shear to then provide damping again.

Depending on the application for which the gear wheel is to be used, or rather on the expected vibrations in said application and the required damping, the viscoelastic material can be mounted on the desired locations.

Not only the location, but also the amount of viscoelastic material that can be mounted, can be chosen. The nature and composition of the viscoelastic material can also be chosen, as well as the initial compression of the viscoelastic material. The latter is the compression of the viscoelastic material upon mounting the blocks in the free spaces between the spokes.

In a practical embodiment, the viscoelastic material takes on the form of one or more pads or O-rings.

Such pad can be laid between the block and the gear wheel as it were. An O-ring can be mounted around the block.

In a practical embodiment, the block is composed of different partial blocks.

In a practical embodiment extra partial spokes can be added which are only connected to the hub or only to the rim. Said blocks or partial blocks are then placed between a full spoke and a partial spoke.

Viscoelastic material can also be mounted between the different partial blocks which will provide extra damping.

In a preferred embodiment, the blocks are part of, or form one whole with the gear hub.

Grooves will be located between the gear wheel on the one hand and the block on the other hand which are filled with a fluid.

Consequently, a squeeze film damper is formed, which will dampen the torsional vibrations.

The invention further relates to a compressor device comprising:
 a compressor element for compressing a gas,
 a drive for driving the compressor element;
 a transmission between the drive and the compressor element;
characterised in that the transmission comprises at least one gear wheel according to the invention.

This provides the advantage that by applying a gear wheel according to the invention with improved damping properties, the damping value of the transmission can be increased, such that excitation of certain mode shapes can be reduced or avoided.

The gear wheel can be mounted both on a shaft of the drive and on a shaft of the compressor element.

With the intention of better showing the characteristics of the invention, a few preferred embodiments of a gear wheel according to the invention are described hereinafter by way of an example, without any limiting nature, with reference to the accompanying drawings, wherein.

Figure 1:
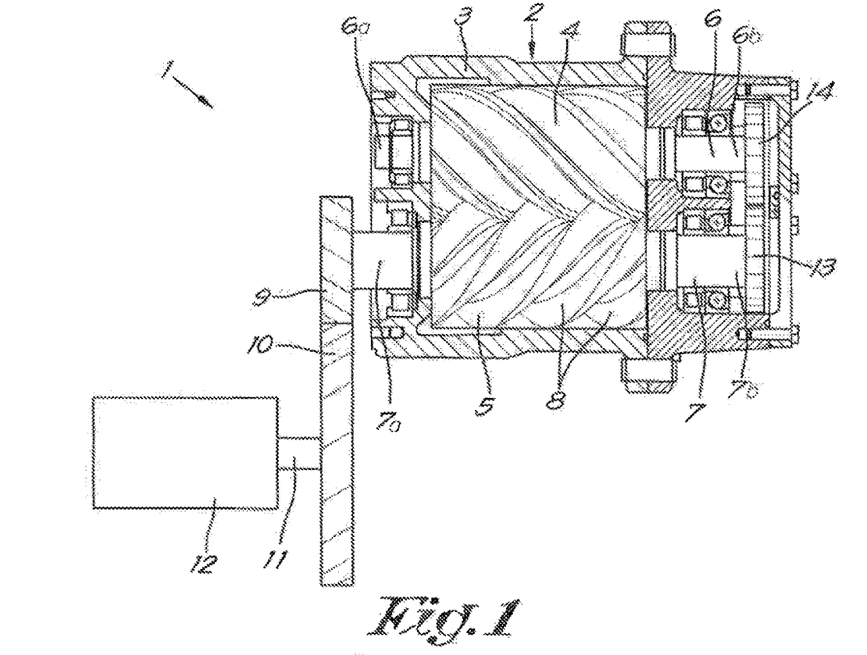
FIG. 1 schematically shows a compressor device according to the invention with a gear wheel according to the invention.

FIG. 1 schematically shows a compressor device according to the invention, which in this case is a screw compressor device 1 provided with a compressor element 2. It is possible that the screw compressor device 1 is provided with more than one such compressor element 2.

The compressor element 2 comprises a housing 3 in which two rotors 4, 5 are mounted with their shafts 6, 7 on bearings. These rotors 4, 5 are so-called screw rotors, i.e. a male screw rotor 4 and a female screw rotor 5, with lobes 8 that can rotate cooperatively into each other.

At one end 7*a* of the shaft 7 of one of the rotors 5 a first driving gear wheel 9 is provided that can engage with a second driving gear wheel 10, whereby said second gear wheel 10 is mounted on a shaft 11 of a drive 12.

Said drive 12 is an electric motor for example.

In this case the driving gear wheel 9 is mounted on the male rotor 5, but it can also be mounted on the female rotor 4.

Further, the other end 7*b* of the shaft 7 of said rotor 5 and the corresponding end 6*b* of the shaft 6 of the other rotor 4, are each provided with a so-called synchronisation gear wheel 13, 14

Said gear wheels 13 and 14 are typically provided with a straight cut gear mesh 15 on their relevant rims 16. Said gear wheels 9 and 10 are provided with a slanted gear mesh. Obviously it is also possible that all gear wheels 9, 10, 13 and 14 have a straight cut gear mesh or that they all have a slanted gear mesh or another combination.

As is clearly shown on FIG. 1, there is no elastic coupling between the electric motor 12 and the driven rotor 5.

The transmission between the electric motor 12 and the driven rotor 5 is provided completely by the driving gear wheels 9, 10.

Figure 2:
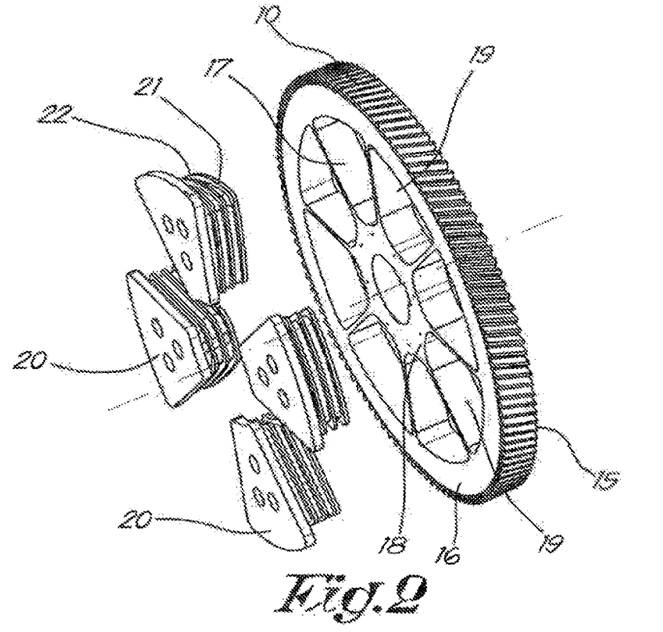
FIGS. 2 and 3 show the gear wheel of FIG. 1.
Figure 3:
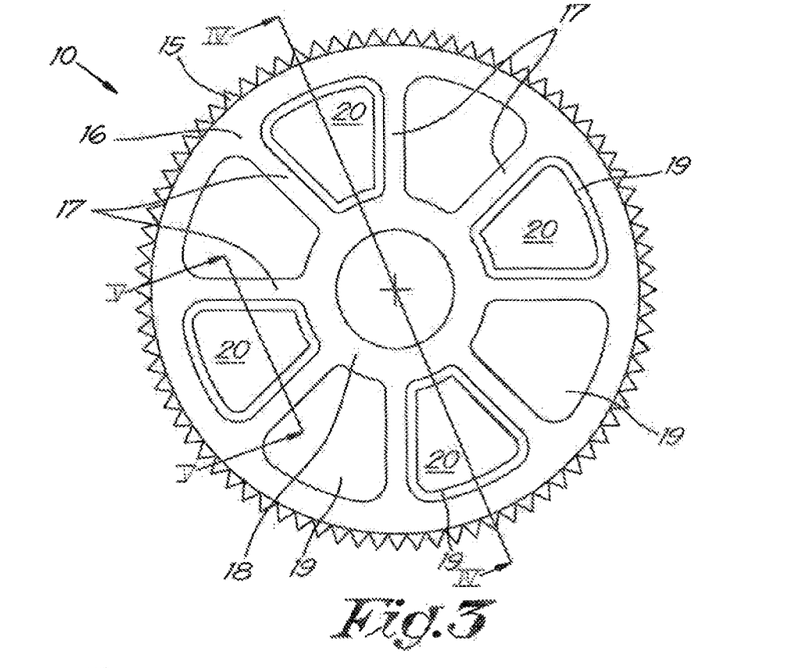

One of said driving gear wheels 10 is provided with spokes 17 as shown in FIGS. 2 and 3, which are mounted between the rim 16 with the gear mesh 15 and the gear hub 18 of the gear wheel 10, whereby between the spokes 17 free spaces 19 are located which extend between the rim 16 and the gear hub 18.

In this case the driving gear wheel 10 mounted on the motor 12 is provided with such spokes 17. Naturally it is not excluded that another or several other gear wheels 9, 13, 14 are provided with such spokes 17.

FIGS. 2 and 3 clearly show that the driving gear wheel 10 is provided with eight spokes 17 in this case which extend from the hub 18 to the rim 16.

The spokes 17 in the example shown, but not necessarily for the invention, are beam-shaped and have a constant cross-section.

According to the invention, at least one of said free spaces 19 is filled with a block 20 or core made of a rigid, incompressible material.

The block 20 is preferably made of, for example, aluminium or polyurethane, but other metal or synthetics are also possible.

As shown in FIG. 3, half of the, in total, eight free spaces 19 are filled with such block 20, whereby the division of the four blocks 20 is symmetrical.

Figure 4:
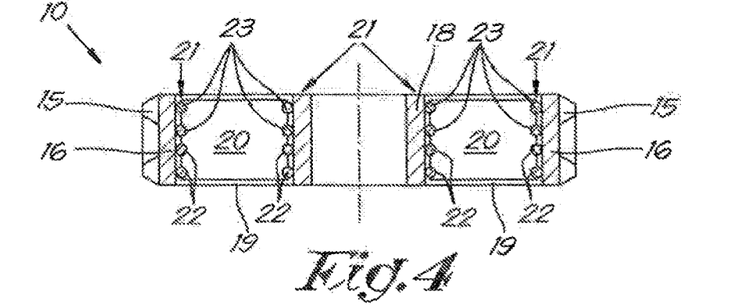
FIG. 4 shows a cross-section according to the line IV-IV in FIG. 3.
Figure 5:
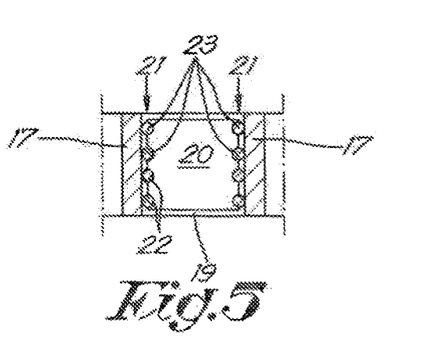
FIG. 5 shows a cross-section according to the line V-V in FIG. 3.

According to the invention and as visible in the cross-sections of FIGS. 4 and 5, a viscoelastic material 21 is located between the gear wheel 10 on the one hand and the block 20 on the other hand.

The viscoelastic material 21 is in this case, but not necessarily, made of rubber. This rubber can be both natural and synthetic, but other materials can also be applied, such as neoprene.

As is shown in FIG. 4, viscoelastic material 21 is mounted between on the one hand the block 20, and, on the other hand, the rim 16 and the gear hub 18.

Said viscoelastic material 21 will cause damping by shear in said material 21 and thus reduce the vibration in the mode shapes.

As is shown in FIG. 5, viscoelastic material 21 is also mounted between the spokes 17 and the block 20.

Said viscoelastic material 21 will cause damping by tension loads in said material 21.

It is possible that only viscoelastic material 21 is located between the spokes 17 and the block 20, whereby no viscoelastic material 21 is provided between the block 20 on the one hand and the rim 16 and the gear hub 18, on the other hand.

It is also possible that only viscoelastic material 21 is located between the block 20 on the one hand and the rim 16 and the gear hub 18, on the other hand, whereby no viscoelastic material 21 is provided between the spokes 17 and the block 21.

The amount of viscoelastic material 21 which is provided depends on the damping which is desired or necessary for the relevant application.

In the example of FIGS. 4 and 5, the viscoelastic material 21 takes on the form of a number of O-rings 22, in this case four. But this could also only be one, two, three or more than four O-rings.

Said O-rings are tensioned around the block 20 as it were.

To this end the block 20 is preferably provided with a groove 23 or recess provided for this purpose.

Preferably, the viscoelastic material 21 is at least partially compressed, this means: even without any torsional or vibrational load the viscoelastic material 21 is already partially compressed.

Tests have shown that said so-called pre-load will improve the operation.

Instead of a hard block 20 with viscoelastic material 21, it is also possible to choose to make the block 20 in viscoelastic material Such embodiment will be comparable to the embodiment as shown in FIG. 3, with the difference that there will be no viscoelastic material 21.

The operation of the screw compressor device 1 and the gear wheel 10 is very simple and as follows.

During the operation, the drive 12 will drive the second driving gear wheel 10. The operation of the gear wheels will also set in motion the first driving gear wheel 9.

Consequently the male screw rotor 5 will be set in motion, whereby the operation of the synchronisation gear wheels 13, 14 causes the female screw rotor 4 to follow the motion synchronously, in order to enable the gas in the compressor element 2 to be compressed.

During the operation, all kinds of dynamic force combinations of the different mode shapes will occur, including for example the combined torsional-lateral bending mode or torsional lateral mode.

Under the influence of the excited mode shape, the second driving gear wheel 10 will deform somewhat.

Consequently, the space 19 between the spokes 17 and the block 20 will deform, such that the viscoelastic material 21 located there, will be compressed. Consequently, the relevant mode shape is damped.

The extent to which said mode shape is damped depends on the relative deformation of the second driving gear wheel 10, the used damping materials and the pre-load.

Figure 6:
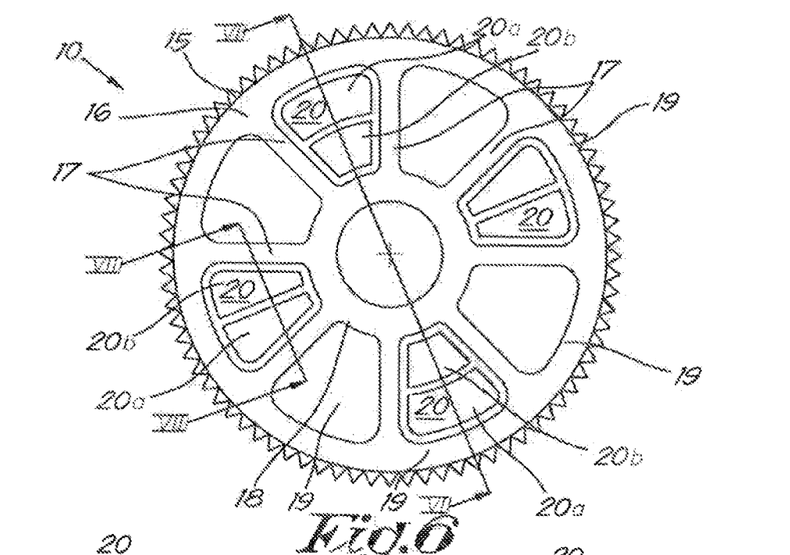
FIG. 6 shows a variant of FIG. 3.
Figure 7:
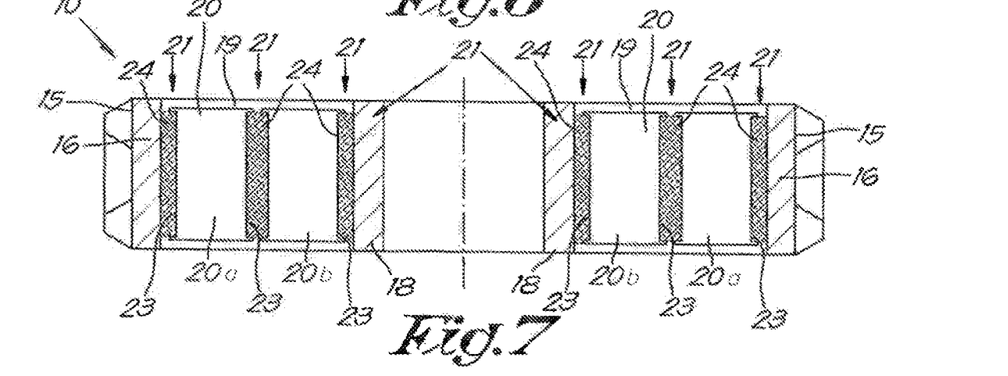
FIG. 7 shows a cross-section according to the line VII-VII in FIG. 6.
Figure 8:
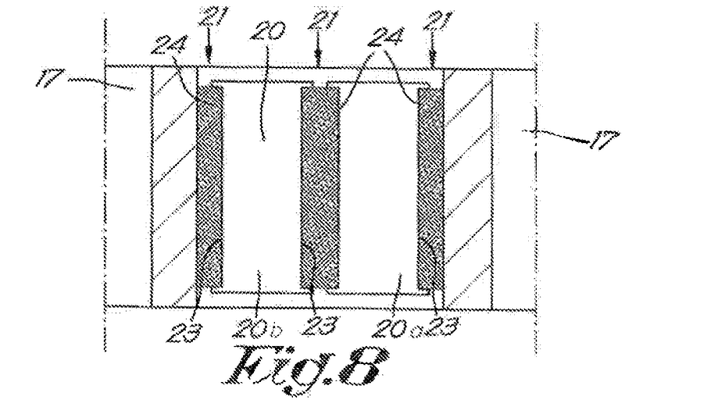
FIG. 8 shows a cross-section according to the line VIII-VIII in FIG. 6.

FIGS. 6 to 8 show a variant according to FIGS. 2 to 5, whereby in this case the block 20 is divided into or composed of different partial blocks 20a, 20b.

In this case two partial blocks 20a, 20b are provided.

In two free spaces 19 the block 20 is divided parallel with the spokes 17, in two other free spaces 19 the block 20 is divided perpendicular to the spokes 17.

Just as in the previous embodiment, half of the free spaces 19 are filled. Of course it is also possible that less or more, or all, free spaces 19 are filled.

FIG. 7 shows a cross-section of the blocks 20 which are divided perpendicular to the spokes 17.

FIG. 8 shows a cross-section of a block 20 that is divided parallel with the spokes 17.

Viscoelastic material 21 is mounted between the different partial blocks 20a, 20b.

In this case the viscoelastic material 21 takes on the form of one or more pads 24, slices, plates or sheets.

The pads 24 can be mounted between the blocks 20 or between a block 20 and the gear wheel 10, whereby they are mounted around the relevant block 20 or partial block 20a, 20b.

The pads 24 are, as in the previous embodiment, mounted in recesses 23 provided for this purpose, but this is not necessarily the case.

It is also possible that the pads 24 are constructed of different separate strips.

In this case too the viscoelastic material 21 in the form of the pads 24 is at least partially compressed.

Although in the example of FIGS. 6 to 8 there are always only two partial blocks 20a, 20b per filled free space, it is not excluded that there are several partial blocks 20a, 20b.

By providing many partial blocks 20a, 20b, a sort of lamella-shaped partial blocks 20a, 20b with O-rings 22 or pads 24 of viscoelastic material 21 in between is obtained.

Figure 9:
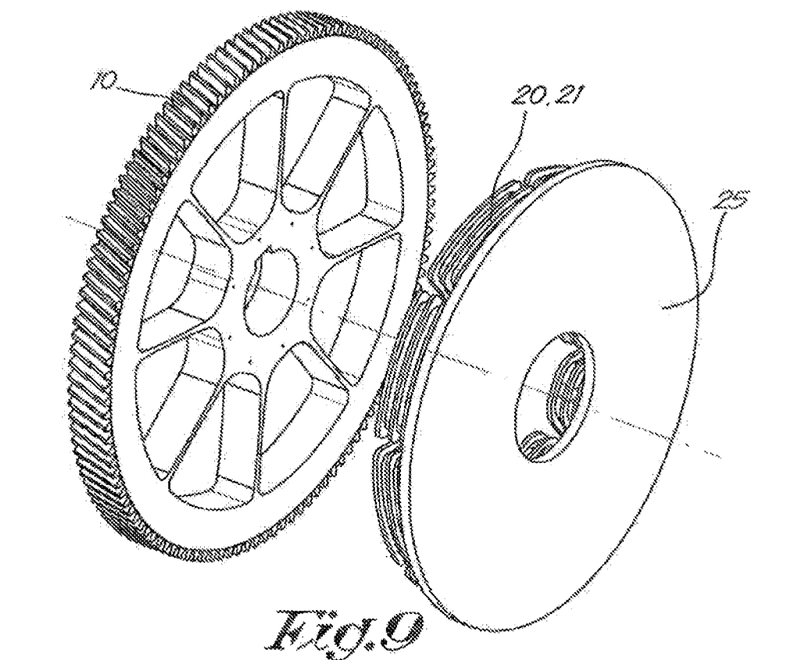
FIG. 9 shows a variant of FIG. 2.

FIG. 9 shows a variant embodiment of FIG. 2, whereby the blocks 20 are mounted on a disk 25 or plate.

It is also possible that said blocks 20 together with said disk 25 form one whole, this means: that they are made of one piece of material.

Such structure can also be applied with the variant of FIGS. 6 to 8.

The use of such disk 25 is handy in the manufacture of the gear wheel 10, i.e. when mounting or placing the blocks 20 in the free spaces 19 between the spokes 17 of the gear wheel 10.

As can be deduced from FIG. 9, the disk 25 is located next to the gear wheel 10. It is also possible that the disk 25 is located against the gear wheel 10.

Figure 10A:
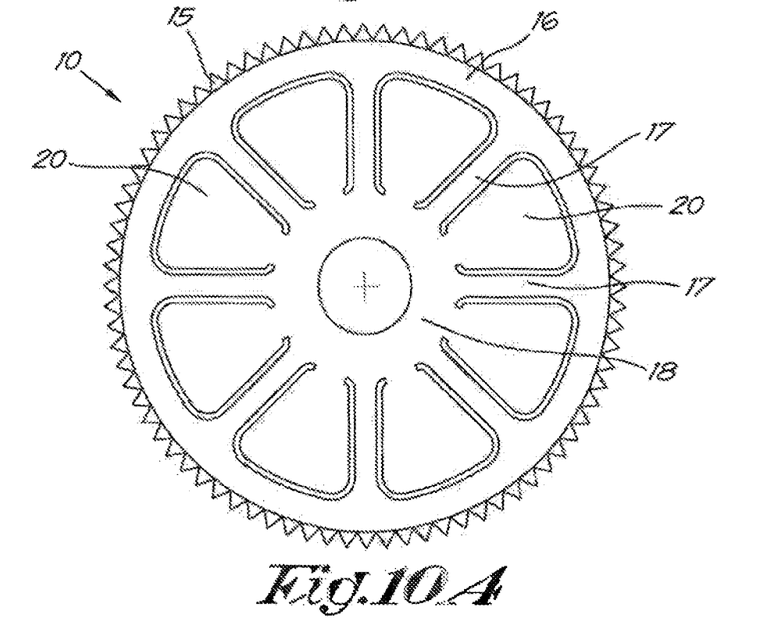
FIGS. 10*a* and 10*b* show yet two other variants of FIG. 2.
Figure 10B:
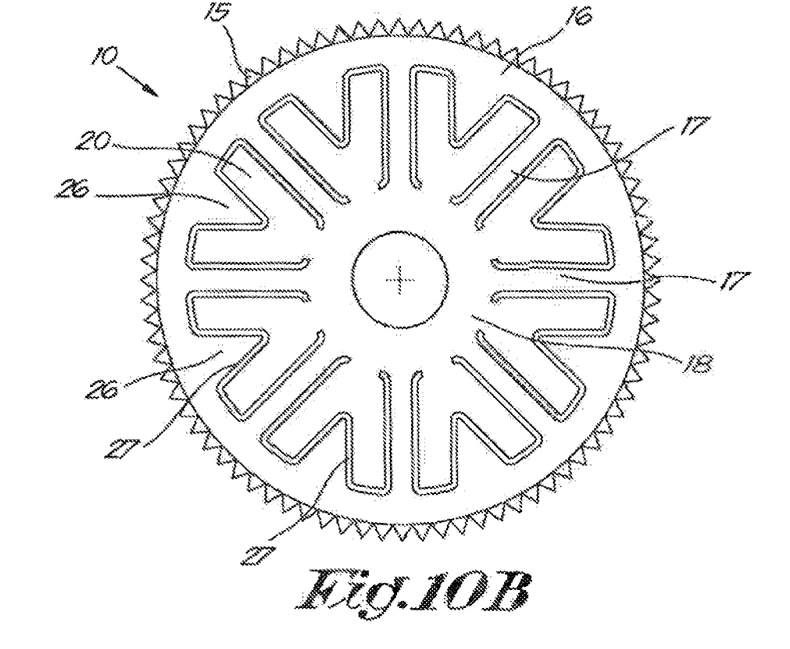

FIGS. 10a and 10b show another two variants of FIG. 3.

In the case of FIG. 10a, the blocks 20 are in direct contact with the gear hub 18. This means that no viscoelastic material 21 is located between a block 20 and the gear hub 18.

In this case the blocks 20 are even part of the gear hub 18 or, in other words, they form one whole with it Between the blocks 20, on the one hand, and the spokes 17 and rim 16, on the other hand, viscoelastic material 21 is mounted.

FIG. 10b shows a same embodiment, but here the form of the blocks 20 is different. In this case there is a protrusion 26 on the rim 16 and an associated recess 27 in the blocks 20. Consequently, the blocks 20 have a sort of V-shaped cross-section.

Figure 11:
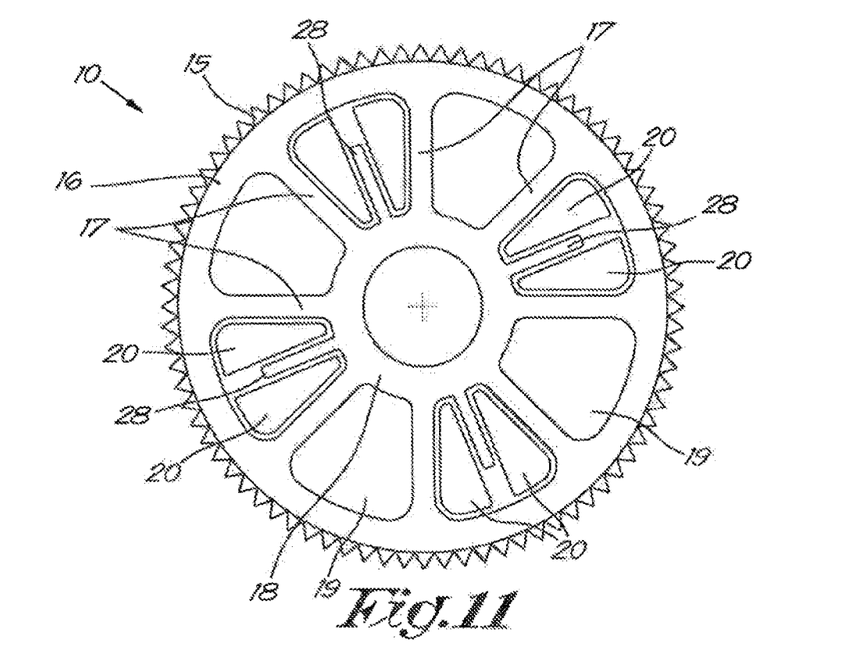
FIG. 11 shows a variant of FIG. 6.

FIG. 11 shows a variant embodiment of FIG. 6, whereby the second driving gear wheel 10 is in this case provided with a number of partial spokes 28, which are only connected to the gear hub 18. In other words, they do not extend from the gear hub 18 up to the rim 16 in the same way as the spokes 17.

It is not excluded that the partial spokes 28 are only connected to the rim 16.

In this case there are four such partial spokes 28.

The blocks 20 are placed in the space between a partial spoke 28 and a spoke 17.

The viscoelastic material 21 is mounted between the blocks 20 on the one hand and the rim 16, the gear hub 18, the spokes 17 and/or the partial spokes 28 on the other hand.

Figure 12A:
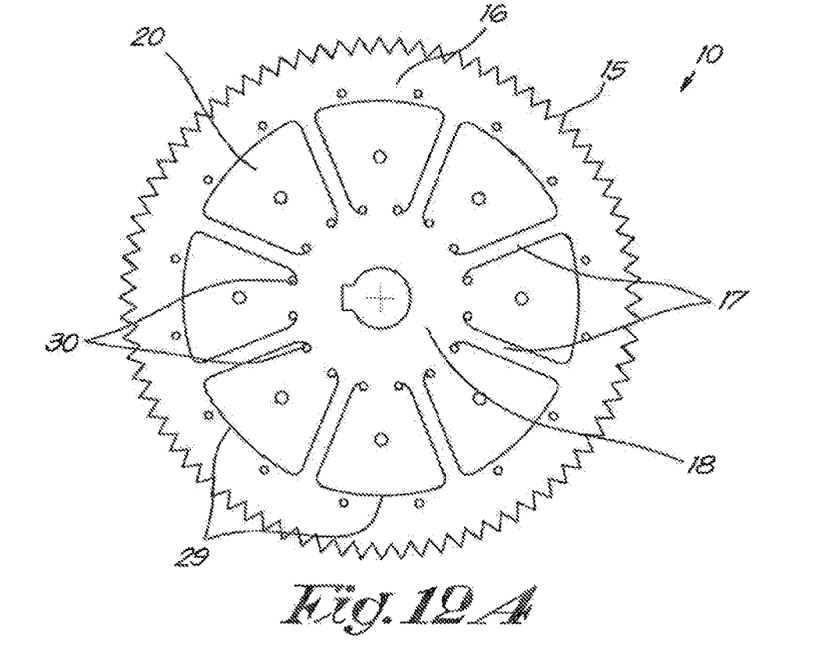
FIGS. 12*a*, 12*b* and 12*c* show a variant of FIG. 10*a*.
Figure 12B:
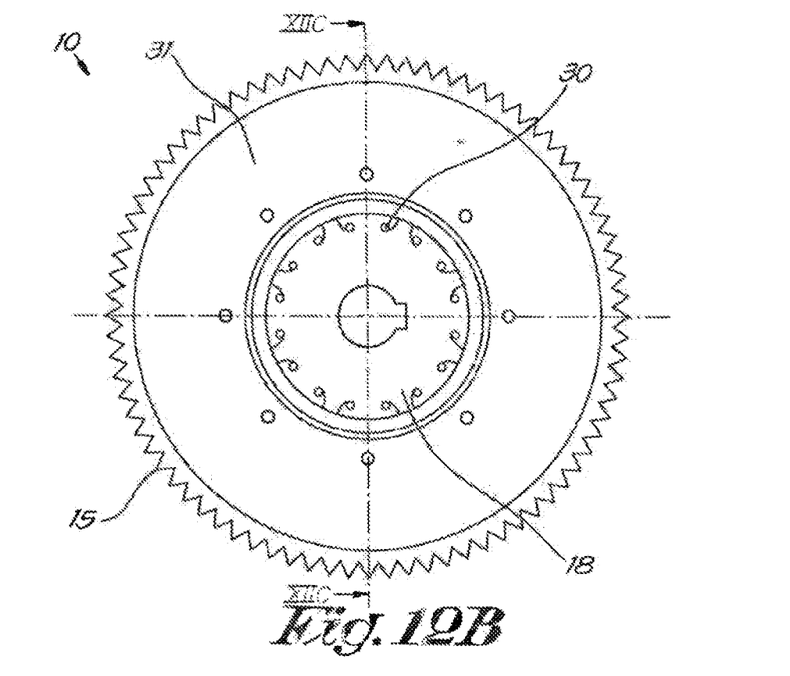
Figure 12C:
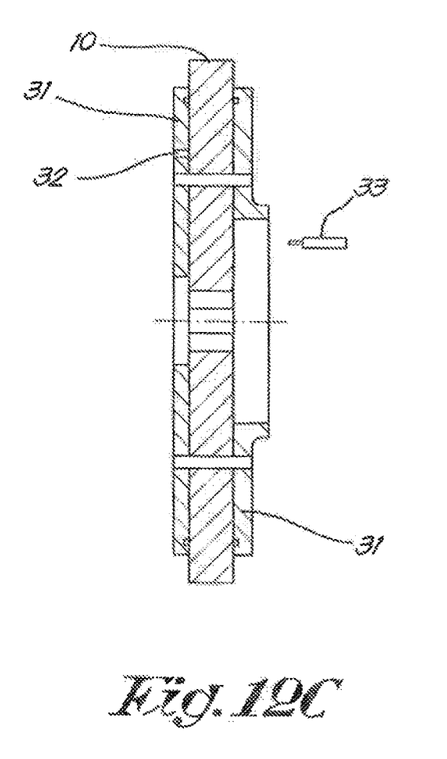

FIGS. 12a, 12b and 12c show a last variant of a gear wheel 10 according to the invention.

Here, grooves 29 are located between the gear wheel 10 on the one hand and the block 20 on the other hand.

The width, or thickness, of the grooves is preferably less than 1 millimetre.

Said grooves are practically realised by for instance EDM or wire electrical discharge machining, and as a result of this possess a bulge 30 on their end.

The grooves 29 are filled with a fluid.

This fluid possesses viscous properties and is for example, but not necessarily, oil.

In this way squeeze film dampers are formed in the grooves 29.

To ensure the oil in the grooves 29 effectively remains in the grooves 29 during rotation of the gear wheel 10, the gear wheel 10 is provided with two cover plates 31 in this case, one on each side of the gear wheel 10, to close the grooves 29.

It is also possible that only one cover plate 31 is provided.

It is possible that the cover plates 31 completely cover the grooves 29, this means that the fluid in the grooves 29 cannot leak out. This has the advantage that as soon as the oil or fluid is injected or inserted in the grooves 29, no more oil is needed.

However, it is possible that the cover plate 31 or cover plates 31 are provided with drain channels or drain openings for the fluid. FIG. 12c schematically shows such drain channel 32.

As shown in FIG. 12c the drain channel 32 extends perpendicularly through the cover plate 31, from the side of the cover plate 31 oriented to the gear wheel 10 in a location located near the grooves 29 to the other side of the cover plate 31, i.e. the side of the cover plate 31 facing away from the gear wheel 10.

It is important hereby that the drain channel 32 is in connection with the groove 29 such that a fluid, such as for example oil, can flow from the groove 29 to the drain channel 32.

Preferably, such drain channel 32 will be provided for every groove 29.

Although the drain channel 32 is drawn as a straight channel, which extends in a direction perpendicular to the plane of the cover plate 31, it is not excluded that the drain channel 32 is oriented differently.

It is also not excluded that the different drain channels 32 provided in the cover plate 31 convene in a certain point, whereby from this point one joint channel continues to said other side of the cover plate 31.

Such gear wheel from FIGS. 12a, 12b and 12c will be applied in a compressor device which is provided with an oil-injection circuit with a nozzle 33 or the like which can inject oil in the grooves 29 of the gear wheel 10.

The nozzle 33 will be placed hereby on the level of the bulges 30 of the grooves 29. This is schematically shown in FIG. 12.

During the rotation of the gear wheel 10 the oil will be injected in the bulges 30 and the centrifugal force will force the oil in the grooves 29, such that a squeeze film damper is created in the grooves 29.

The cover plates 31 will ensure that the oil remains in the grooves 29, whereby the oil can flow out via the drain channel 32. The oil that flows out is then quickly refilled by injecting new oil with the nozzle 33.

The heat which is inevitably generated during the operation of the compressor device 1 will ensure that the viscosity of the oil reduces, such that the damping will decrease.

By injecting fresh oil, and draining oil via the drain channel 32, it is ensured that fresh, cold oil will always be in the grooves 29 such that the damping is always optimal.

Furthermore, it is also possible to check the flow of the oil which is injected such that oil is only injected when vibrations and/or resonances occur.

The advantage of this is that oil will only be injected in the gear wheel 10 when damping is needed, such that no oil is injected unnecessarily.

The speeds of the compressor device 1 for which such vibrations or resonances occur can be pre-defined and the flow of the oil-injection can be regulated to inject oil when the compressor device 1 runs at said speeds, but it is also possible to perform real time measurements of the vibrations or resonances during the operation of the compressor device 1 and regulate the oil injection based on such measurement.

Although in the example shown a gear wheel according to the invention is applied in a transmission of a screw compressor, it is not excluded that the gear wheel is applied in other machines. The invention is not restricted either to application of a gear wheel according to the invention as a second driving gear wheel, but another gear wheel or a combination of gear wheels of the compressor device can also be executed in this way.

The present invention is by no means limited to the embodiments described as an example and shown in the drawings, but a gear wheel according to the invention can be realised in all kinds of forms and dimensions, without departing from the scope of the invention.

The invention claimed is:

1. A gear wheel with at least one dampening block that can be used for a gearbox or gear transmission comprising:
   the gear wheel provided with spokes (17) which extend between a rim (16) supporting a gear mesh (15) and a corresponding gear hub (18), whereby free spaces (19) are located between the spokes (17) which extend between the rim (16) and the gear hub (18), wherein at least one of said free spaces (19) is filled with the at least one dampening block;
   the at least one dampening block comprising a block (20) made of a rigid, incompressible material and a viscoelastic material or a viscous fluid,
   wherein the viscoelastic material or a viscous fluid is located between the gear wheel (10) and the block (20) at least partially in a recess provided in the block.

2. The gear wheel with the at least one dampening block according to claim 1, wherein the block (20) is forming a core made of a rigid, incompressible material.

3. The gear wheel with the at least one dampening block according to claim 1, wherein in the case a viscoelastic material (21) is located between the gear wheel (10) and the block (20), during deformation of the gear wheel (10), the viscoelastic material (21) is compressed between the block (20) and the gear wheel (21) which results in damping, whereas the block (20) ensures that the deformation of the gear wheel (21) remains limited, and in the case a viscous fluid is located between the gear wheel (10) and the block (20), the recess includes grooves that are located between the gear wheel (10) and the block (20) which are filled with the viscous fluid and a squeeze film damper is formed.

4. The gear wheel with the at least one dampening block according to claim 1, wherein the block (20) is made of aluminium or polyurethane.

5. The gear wheel with the at least one dampening block according to claim 1, wherein the viscoelastic material (21) is made of rubber or another damping material.

6. The gear wheel with the at least one dampening block according to claim 1, wherein the viscoelastic material (21) takes on the form of one or more pads (24) or O-rings (22).

7. The gear wheel with the at least one dampening block according to claim 6, wherein said pad (24) or O-ring (22) is mounted around the block (20) in the recess.

8. The gear wheel with the at least one dampening block according to claim 1, wherein the viscoelastic material (21) is mounted between the spokes (17) and the block (20).

9. The gear wheel with the at least one dampening block according to claim 8, wherein the viscoelastic material (21) is mounted between the different partial blocks (20a, 20b).

10. The gear wheel with the at least one dampening block according to claim 1, wherein the viscoelastic material (21) is mounted between the block (20) and the gear hub (18) and the rim (16).

11. The gear wheel with the at least one dampening block according to claim 1, wherein the block (20) is composed of different partial blocks (20a, 20b).

12. The gear wheel with the at least one dampening block according to claim 1, wherein the gear wheel (10) is provided with extra partial spokes (28) which are only connected to the gear hub (18) or the rim (16), whereby the block (20) is mounted between a respective spoke (17) and a respective extra partial spoke (28).

13. The gear wheel with the at least one dampening block according to claim 1, wherein the viscoelastic material (21) is at least partially compressed.

14. The gear wheel with the at least one dampening block according to claim 13, wherein said disk (25) extends next to or against the gear wheel (10).

15. The gear wheel with the at least one dampening block according to claim 1, wherein half of the free spaces (19) between the spokes (17) are filled with a respective at least one dampening block.

16. The gear wheel with the at least one dampening block according to claim 1, wherein the at least one dampening blocks (20) comprises multiple dampening blocks (20) that are mounted on a disk (25) or plate or that the multiple dampening blocks (20) are formed together with the disk (25) or plate.

17. The gear wheel with the at least one dampening block according to claim 1, wherein the at least one dampening block includes multiple dampening blocks (20) that are in direct contact with the gear hub (18).

18. The gear wheel with the at least one dampening block according to claim 17, wherein the at least one dampening block (20) comprises multiple dampening blocks (20) and are part of or formed together with the gear hub (18).

19. The gear wheel with the at least one dampening block according to claim 18, wherein the recess comprises grooves (29) between the gear wheel (10) and the block (20) which are filled with a fluid.

20. The gear wheel with the at least one dampening block according to claim 19, wherein the width of the grooves (29) is less than 1 millimetre.

21. The gear wheel with the at least one dampening block according to claim 19, wherein the gear wheel (10) is provided with one or two cover plates (31) which are placed against the gear wheel (10) to close the grooves (29).

22. The gear wheel with the at least one dampening block according to claim 21, wherein the cover plate or cover plates (31) are provided with drain channels (32) for the fluid.

23. The gear wheel with the at least one dampening block according to claim 17, wherein the fluid is oil.

24. A compressor device comprising:
a compressor element for compressing a gas,
a drive for driving the compressor element;
a transmission between the drive and the compressor element;
wherein the transmission comprises at least one gear wheel with the at least one dampening block according to claim 1.

25. The compressor device according to claim 24, wherein there is a direct coupling of the compressor element and the drive and wherein no flexible coupling is used between the drive and the compressor element for ensuring a dynamic uncoupling between torsional dynamics of the drive and the compressor element.

26. The compressor device according to claim 24, wherein said gear wheel is mounted on a shaft of the drive or on a shaft of the compressor element.

27. The compressor device according to claim 24, wherein the compressor device is further provided with an oil-injection circuit with a nozzle or the like which injects oil in the grooves (29) of the gear wheel (10).

28. The compressor device according to claim 27, wherein the flow of the oil which is injected, is regulated such that only oil is injected when vibrations and/or resonances occur in the compressor device (1).

* * * * *